No. 667,892. Patented Feb. 12, 1901.
H. D. PERKY.
APPARATUS FOR MANUFACTURING CEREALS INTO FORMS OF FOOD OR BREAD.
(Application filed Feb. 27, 1899.)
(No Model.) 7 Sheets—Sheet 1.

WITNESSES
INVENTOR
Henry D. Perky
E. W. Anderson
his Attorney

THE NORRIS PETERS CO., PHOTO-LITHO., WASHINGTON, D. C.

No. 667,892. Patented Feb. 12, 1901.
H. D. PERKY.
APPARATUS FOR MANUFACTURING CEREALS INTO FORMS OF FOOD OR BREAD.
(Application filed Feb. 27, 1899.)
(No Model.) 7 Sheets—Sheet 2.
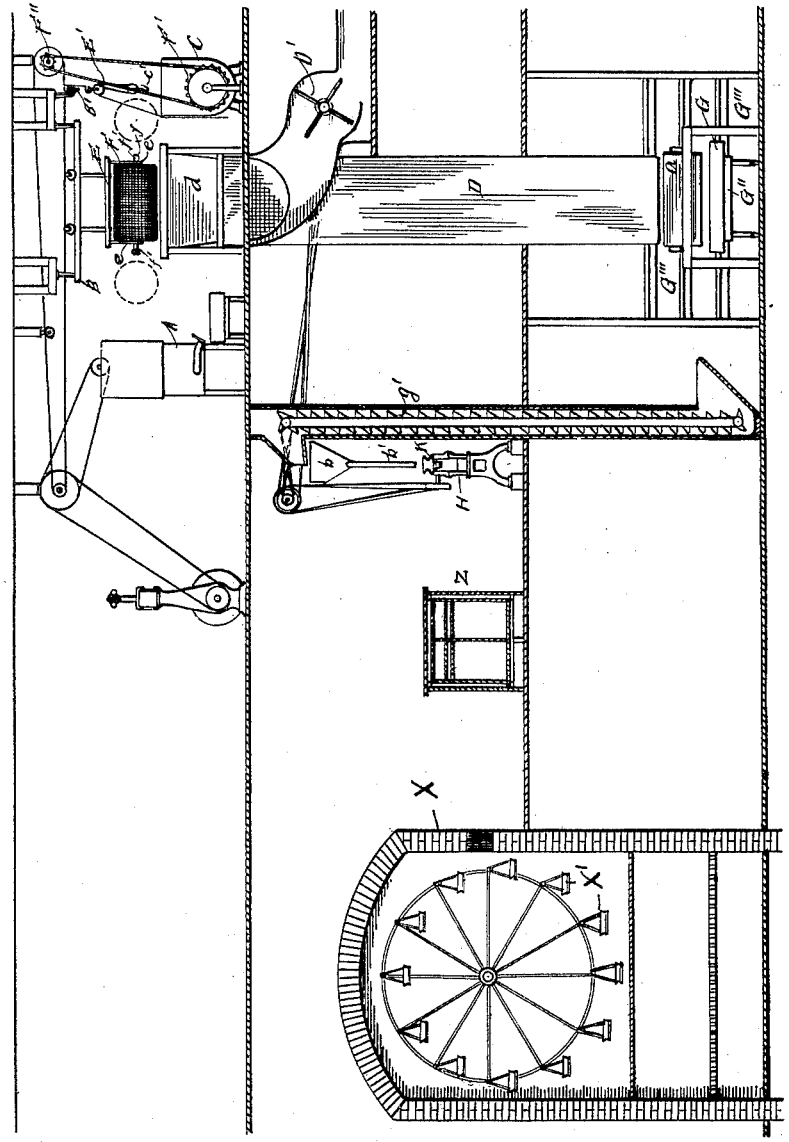
WITNESSES
INVENTOR No. 667,892.  
H. D. PERKY.  
APPARATUS FOR MANUFACTURING CEREALS INTO FORMS OF FOOD OR BREAD.  
(Application filed Feb. 27, 1899.)  
(No Model.)  
Patented Feb. 12, 1901.  
7 Sheets—Sheet 3.
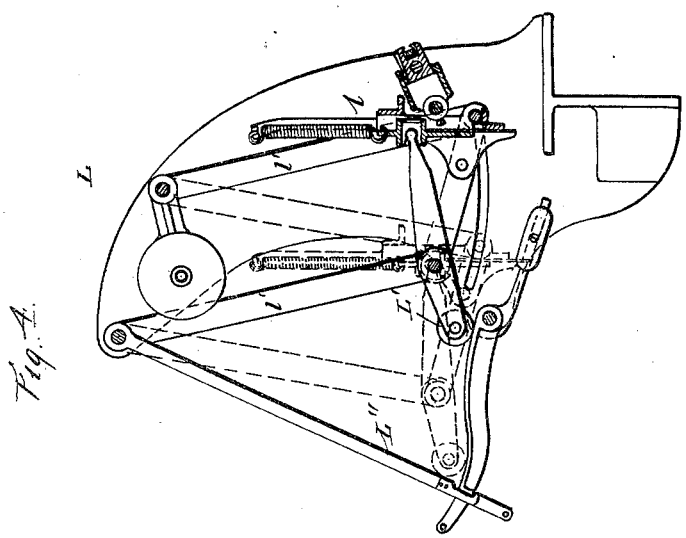
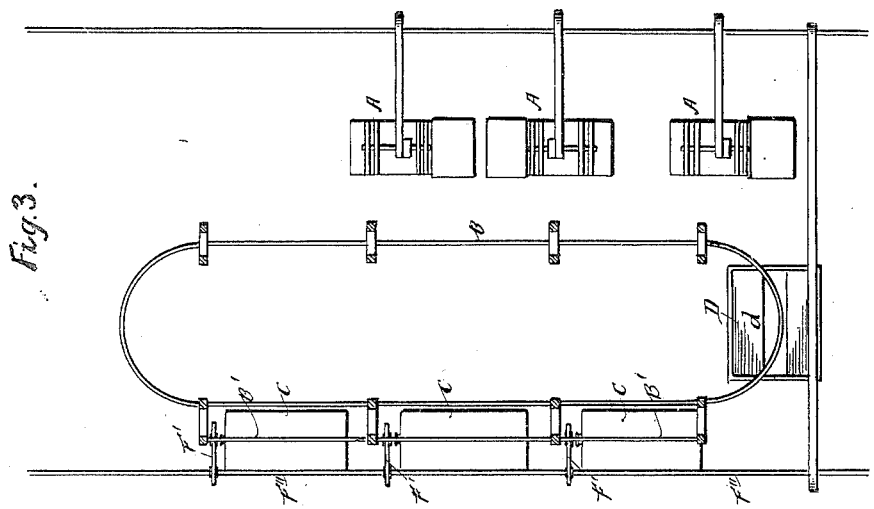
WITNESSES  
INVENTOR  
Attorney

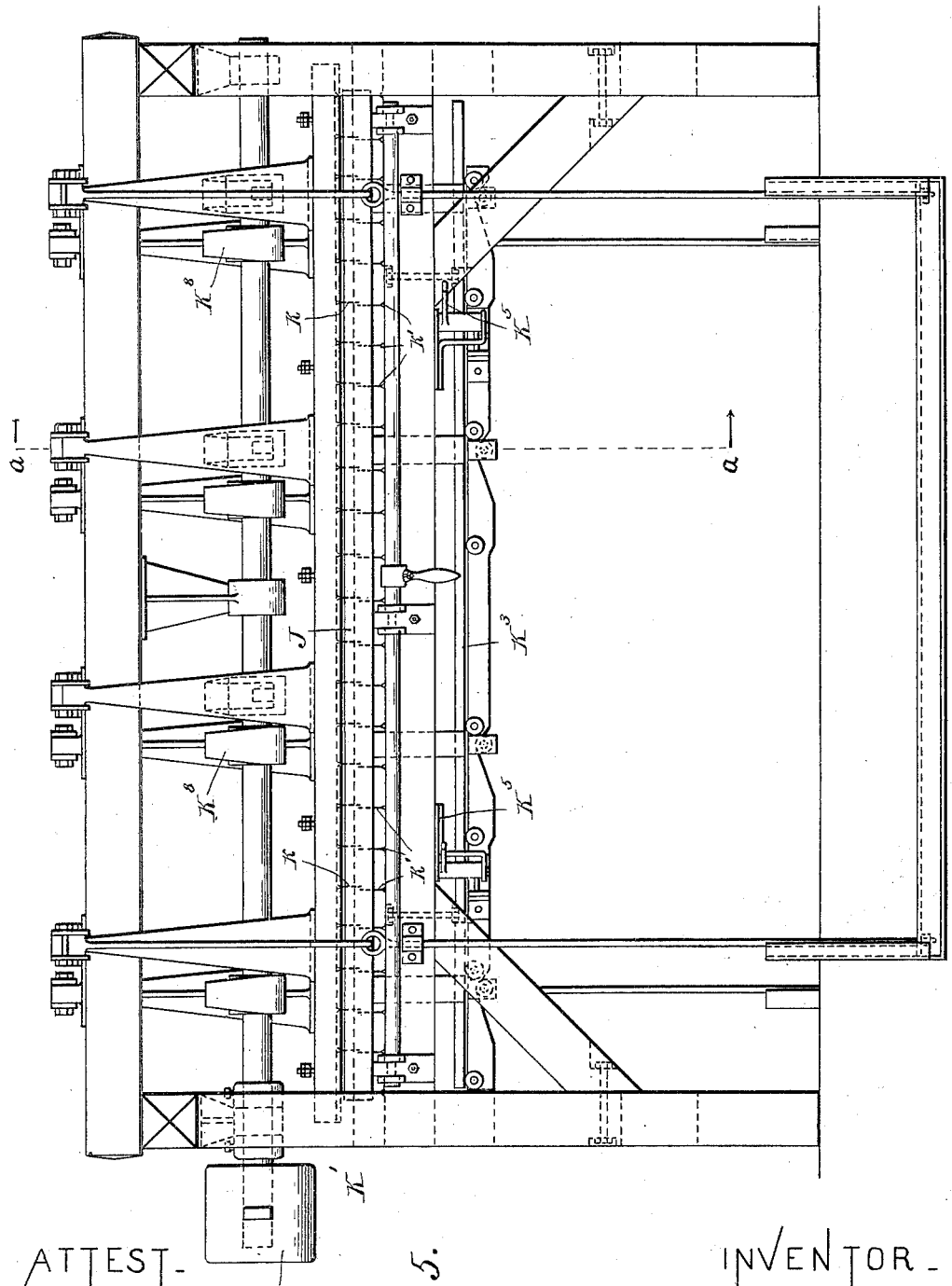

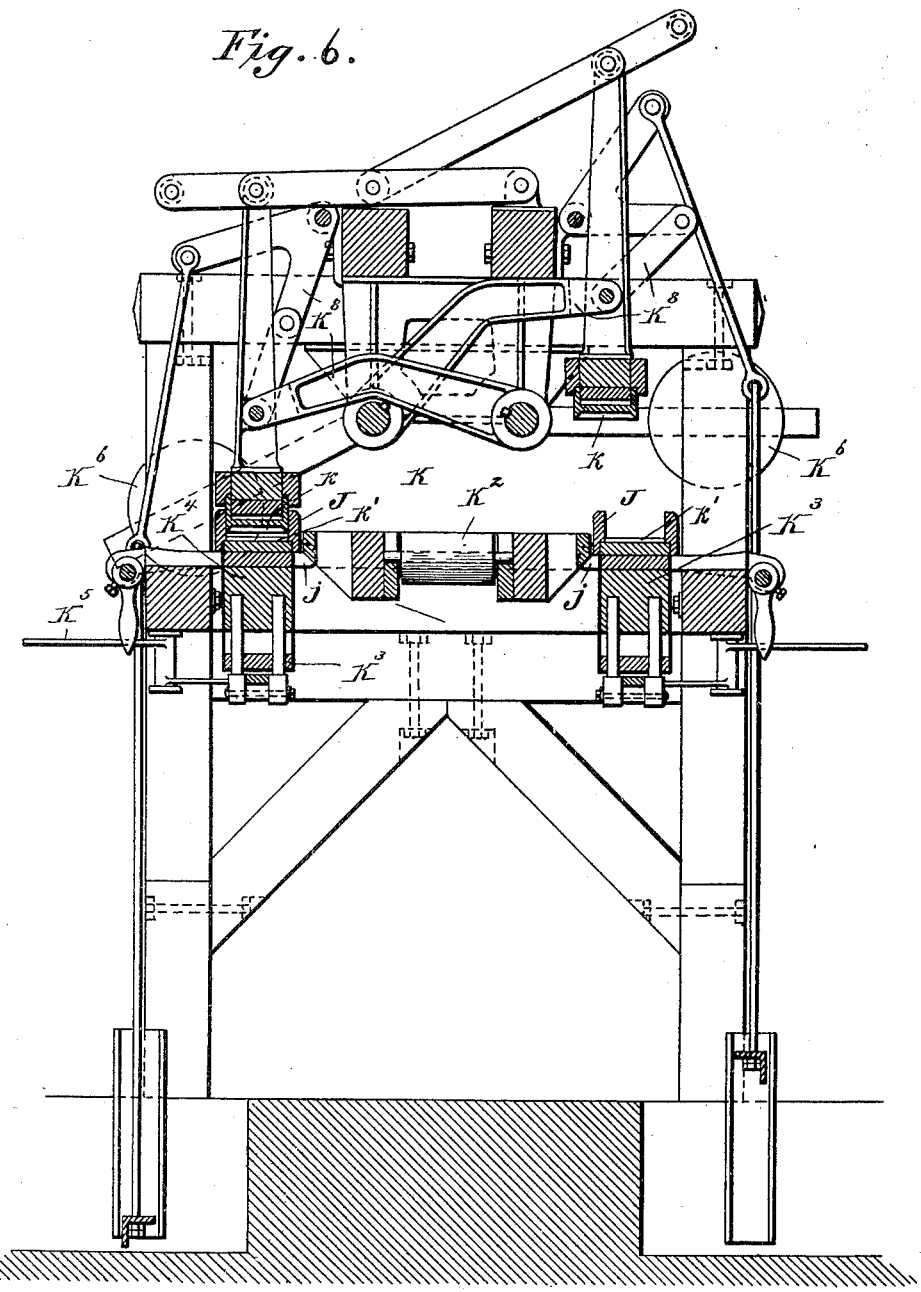

No. 667,892. Patented Feb. 12, 1901.
H. D. PERKY.
APPARATUS FOR MANUFACTURING CEREALS INTO FORMS OF FOOD OR BREAD.
(Application filed Feb. 27, 1899.)
(No Model.) 7 Sheets—Sheet 6
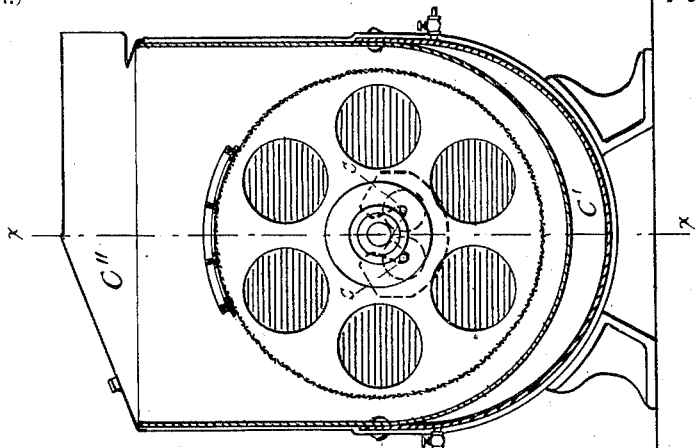
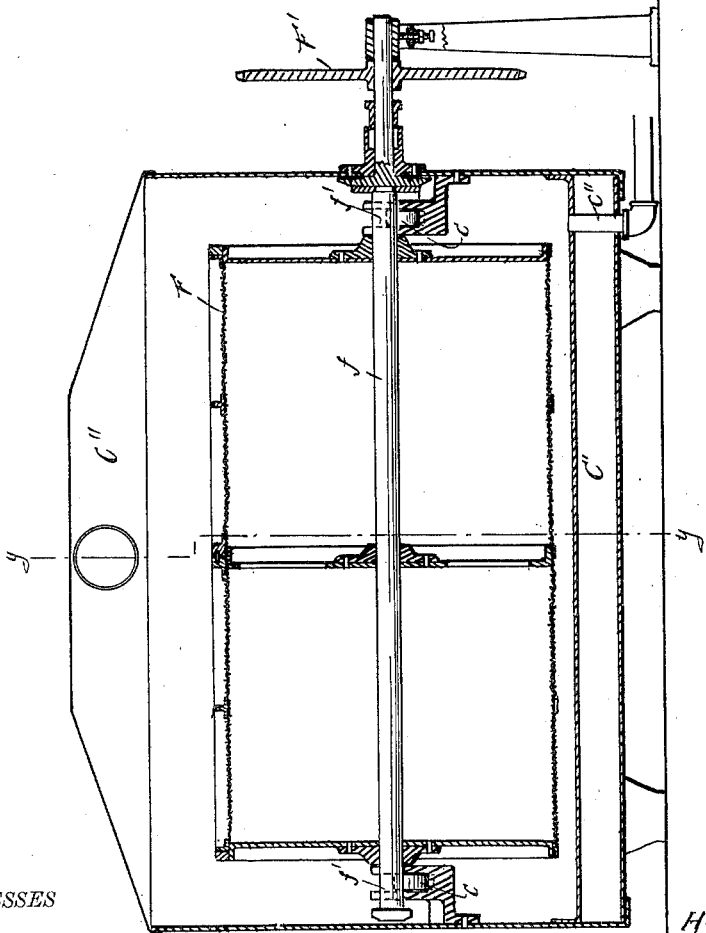
WITNESSES
INVENTOR
Henry D. Perky
by E. W. Anderson
his Attorney No. 667,892. Patented Feb. 12, 1901.
H. D. PERKY.
APPARATUS FOR MANUFACTURING CEREALS INTO FORMS OF FOOD OR BREAD.
(Application filed Feb. 27, 1899.)
(No Model.) 7 Sheets—Sheet 7.

WITNESSES
INVENTOR
Henry D. Perky
by E. W. Anderson
his Attorney

UNITED STATES PATENT OFFICE.

HENRY D. PERKY, OF WORCESTER, MASSACHUSETTS.

APPARATUS FOR MANUFACTURING CEREALS INTO FORMS OF FOOD OR BREAD.

SPECIFICATION forming part of Letters Patent No. 667,892, dated February 12, 1901.

Application filed February 27, 1899. Serial No. 707,085. (No model.)

*To all whom it may concern:*

Be it known that I, HENRY D. PERKY, a citizen of the United States, and a resident of Worcester, in the county of Worcester and State of Massachusetts, have invented certain new and useful Improvements in an Apparatus for the Manufacture of Cereals into Forms of Food or Bread; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
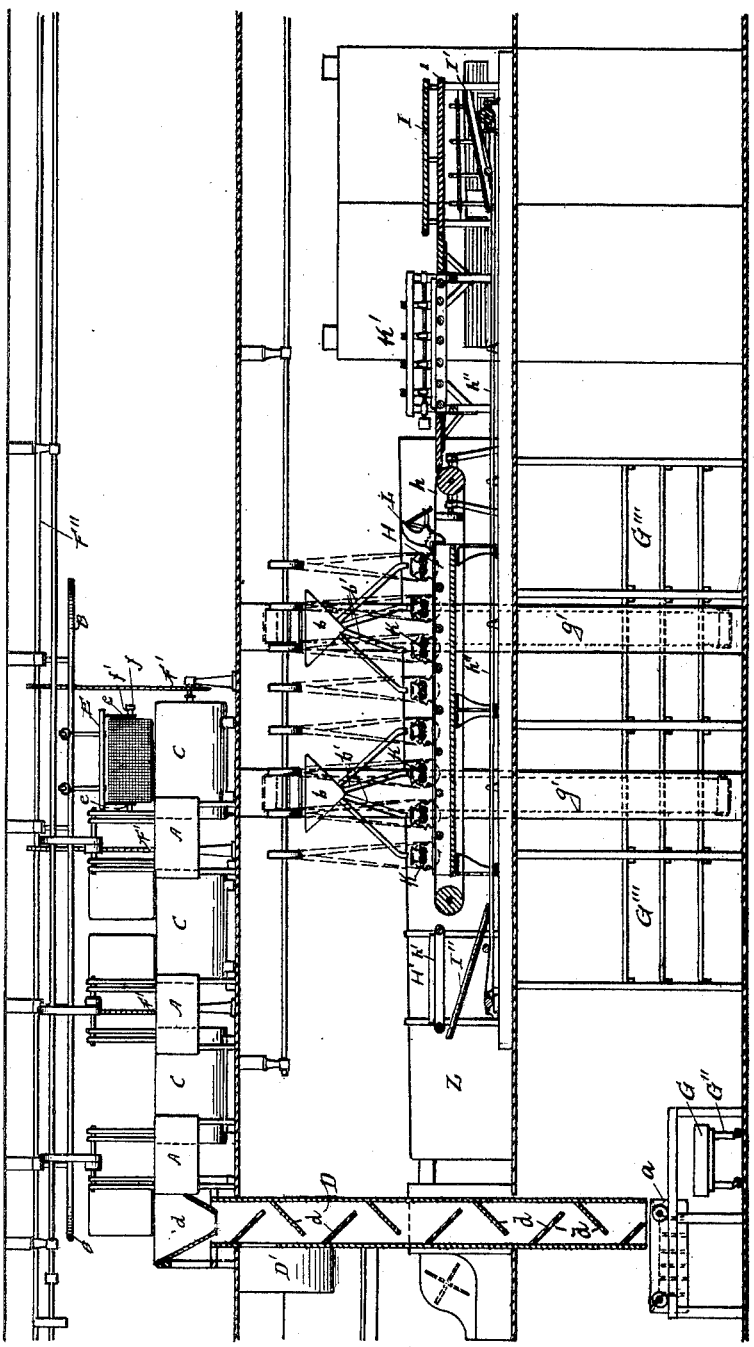
Figure 13:
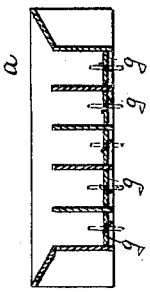
Figure 10:
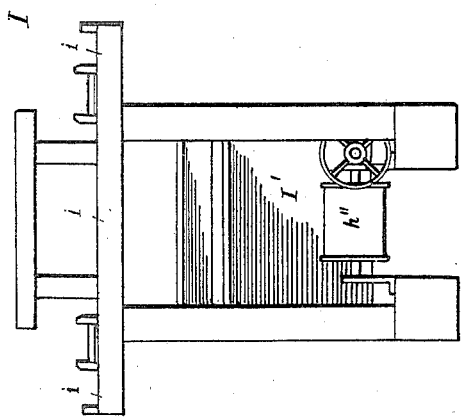
Figure 11:
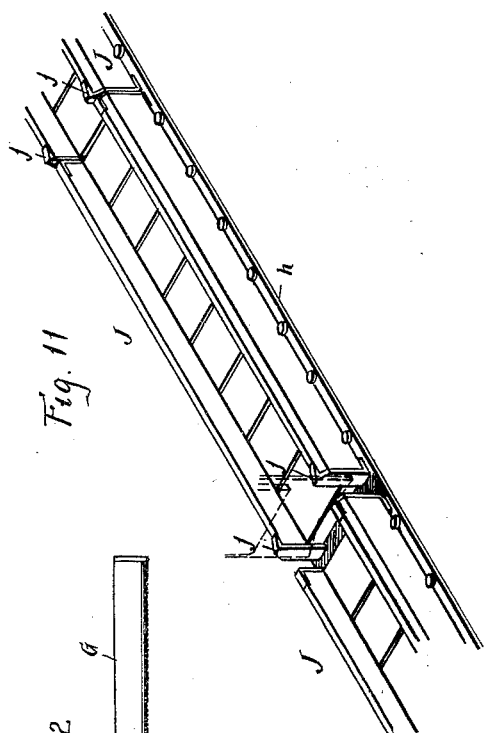
Figure 9:
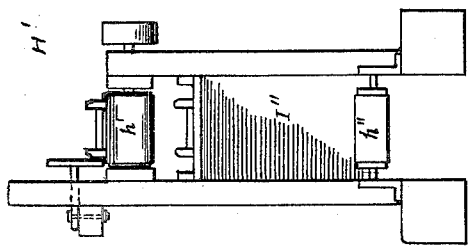
Figure 12:
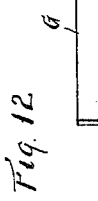

In the accompanying drawings, Figure 1 is a vertical longitudinal section through a building, showing the plant as in operation. Fig. 2 is a vertical transverse section of same. Fig. 3 is a plan view of boilers, cleaners, travelers, &c., on the top floor of a building. Fig. 4 is a sectional view of the section-cutter. Fig. 5 is a side elevation of the gang-cutter table, gang-cutters, and operating mechanism therefor. Fig. 6 is a section on the line $a\ a$, Fig. 5. Fig. 7 is a section on the line $x\ x$, Fig. 8. Fig. 8 is a section on the line $y\ y$, Fig. 7, the cutter upon one side being raised. Fig. 9 is an end elevation of trough-feeding table. Fig. 10 is an end elevation of the panning-table. Fig. 11 is a perspective view of a portion of the belt and sectional receivers thereon, the section-cutter knife being shown in lowered position in dotted lines. Fig. 12 is a detail sectional view of one of the drying-trays. Fig. 13 is a sectional detail view of one of the compartment-receivers.

In Letters Patent No. 548,086, dated October 15, 1895, I have described the process of preparing wheat or similar grain and reducing it to a convenient filamentous or thread-like form for use without taking from the grain any of the beneficial portions which are possessed by the grain in its original state. The present invention has reference to such preparation of the grain in large quantities and its manufacture commercially into food or bread of uniform first quality and at such low rate of manufacture that it will be within the reach of all.

The plant or apparatus is preferably established in a building having several stories for the more convenient operation of the machines and structures involved in carrying out the process. Upon an upper floor are located the cleaning-machines and boilers, and a drying-flue extends from this floor to a lower floor, where the grain is discharged upon trays for further drying. Upon an intermediate floor are located the reducing-machines in gang form.

In the accompanying drawings the letter A designates a cleaning-machine, which is preferably a pulsatory water-cleaner of the general character set forth in Letters Patent No. 533,821, dated February 5, 1895. Any required number of these machines may be employed, according to the capacity of the plant. The grain of commerce is fed to these machines and when discharged therefrom is clean, being without grit or extraneous matter. An overhead track B of continuous form extends from the cleaners to the boilers C and to the mouth $d$ of the drying-flue D. Travelers E, having suspended hooks or catches $e$, are arranged upon the overhead track and serve for the transportation of the wire-cloth cylinders or cages F. The grain discharged from the cleaner is deposited in the cage, which is then closed and fastened and is conveyed by means of the track B to the boiler. Above the series of boilers extends an overhead track B', (see Fig. 3,) having a traveling lift E', Fig. 2, provided with hooks or catches $e'$, said hooks being separated by a distance equal to that between the hooks $e$ of the traveler E, this distance being determined by the length of the cage whose shaft $f$ the hooks are designed to engage at $f'$. The lift is operated until the weight of the cage and its contents bears upon it, being raised sufficiently for the disengagement of the hooks $e$ of the traveler E. The lift is now operated to deposit the cage in the boiler in such manner that its journals rest in the bearing $c$ (see Figs. 7 and 8) of the boiler provided therefor. In order to save weight and to avoid grime and smoke, the boilers are heated by steam, the pipes being indicated at $c''$, Fig. 7. The cage is rotated in the boiler by means of suitable gearing, sprocket-wheels and chains being preferred, as indicated at F', in connection with a line-shaft F''. The boilers are provided with steamheating chambers C' and with covers C''. When the grain is sufficiently cooked and after it has been salted, the cage is lifted out of the boiler and transferred to the traveler E, whereby it is conveyed to the mouth $d$ of the drying-flue D, into which the grain is discharged from the cage. Passing downward through this flue it is diverted from side to side by means of rotary or inclined ledges $d$ in order to facilitate the action upon the grain of the suction-blast through the flue produced by means of a fan at D'. The grain is discharged from the flue into a compartment-receiver $a$, (see Fig. 13,) whereof each compartment is designed to hold a sufficient quantity to charge one of the drying-trays G, into which the grain is discharged by opening the movable bottom $g$ of the compartment. The drying-tray, Fig. 12, is provided with a wire-cloth bottom, which is usually overlaid with cotton sheeting. The grain is then spread evenly in the tray, which is conveyed by means of a carrier G'' between the lines of racks G''', upon one of which the tray, with its charge of grain, is placed for further drying, or the trays may be loaded into an elevator and placed in racks on the floor above the reducing-machines. In the drawings, however, I have shown grain-elevators $g'$, which discharge into the hoppers $b$ of the reducing-machines, each hopper having preferably several branches $b'$, in order that it may feed several heads of the machine.

The reducing-machine H is of gang form, its roller-heads K being arranged in series. These roller-heads are of the general character indicated in Letters Patent No. 532,698, dated January 15, 1895, and in Letters Patent No. 533,555, dated February 5, 1895. The grain fed into the hoppers of the roller-heads is reduced by their grooved rollers to shred or thread like form, each head depositing a layer of the shred-like threads upon the traveling receiver J. As these layers are deposited in succession, the thickness of the product upon the receiver is gradually increased to the extent desired, in accordance with the number of roller-heads constituting the machine or such proportion of them as may be in gear. In order to form biscuit of fair size, I desire to use some thirty-odd heads in the gang.

Below the series of reducing-heads extends the traveling sectional receiver J, (see Fig. 11,) which is carried by the endless belt $h$, running upon a bed of rollers and over suitable end pulleys, one of which is geared to drive the belt. At one end of the gang-machine is the trough-feeding table H', (see Figs. 1 and 9,) having an endless traveling belt $h'$, which moves at a speed a little faster than that of the main receiver-belt $h$. At the other end of the machine is the gang-cutter table K', Figs. 1, 5, and 6, which is usually provided with two gang-cutters, (see Fig. 6,) one on each side, and between said cutters with a roller-bed $K^2$ to receive the troughs as they come loaded with the product from the gang reducing-machine. The trough-feed belt is gaged to be exactly in line with the main receiver-belt and on the same level therewith, as also is the roller-bed $K^2$ of the cutter-table. Beyond the cutter-table and in line therewith is the panning-table I, Figs. 1 and 10, having slideways $i$, the surfaces of which are level with that of the risers $K^3$ of the gang-cutters.

Below the receiver-belt $h$ is the traveling trough-returning belt $h^2$, which is designed to extend from a pulley under the panning-table I to a pulley under the trough-feeding table H'. This belt $h^2$ is supported on suitable rollers, and above it, at its ends, are provided the oppositely-inclined chutes I' and $I^2$. The main receiver-belt $h$ and trough-return belt $h^2$ are usually provided with guide-studs along their edges to keep the troughs in line.

The sectional receiver comprises a number of open-ended troughs J, the bottoms of which are transversely slotted, as indicated in Letters Patent No. 532,286, dated January 8, 1895. The slots are made at equal distance from each other, this distance being that of the width of the biscuit desired. The ends of the troughs are shod with iron to prevent undue wear and to preserve exactness in their length. At the front end of each trough the iron shoe or end piece is provided with a catch lug or projection $j$.

At the delivery end of the gang reducing-machine is located the automatic section-cutter L, actuated by the moving troughs J to divide the reduced product between the troughs and which is provided with a parallel-motion knife-frame $l$, suspended to swinging arms $l'$, and with a lateral projection to engage the catch-lug $j$ of the trough J. The spring-retracted knife is moved downward by means of the cam L', which engages the knife-lever as the knife moves forward. An automatic trip is provided at $L^2$ to release the cam-lever and allow it to fall to prevent the action of the retracting-spring and the return of the knife.

The troughs J returned to the trough-feeder are pushed upward from the return-belt $h^2$ along the inclined chute I', from which they are fed to the belt $h'$, which carries them to the main receiver-belt $h$, automatically closing each trough against the trough which precedes it, and thereby securing close joints between the sections or troughs on the main receiver-belt. In their passage below the reducing-heads the troughs are loaded with the filamentous layers of the grain product. As each trough is discharged from the gang reducing-machine, its load is separated from that of the next trough or section by means of the automatic cutter L. The loaded troughs discharged upon the gang-cutter table K' are slid laterally in position upon the risers $K^3$ of the lower gang or set $k$ of knives. (See Figs. 5 and 6.) The risers $K^3$, secured to a frame $K^4$, are then lowered by means of a lever mechanism $K^5$, letting the trough down upon the lower set $k'$ of knives. The upper set or gang $k$ of knives is designed to have vertical motion, its frame being provided with end guides. This gang of knives is brought downward by means of lever mechanism $K^8$ to divide the load of the product in the trough into biscuit forms. This gang of knives being raised by means of a spring $K^6$ or weight, or both, the risers are elevated to raise the trough to a level with the slideways of the panning-table, to which the trough, with its load, is quickly transferred by endwise movement. The panning-table is provided with a pan-shelf $i'$, preferably above the level of the slideways or ledges $i$, to receive the pans $m$, into which the biscuit are transferred from the troughs by the panners. The empty troughs from the panning-table are transferred by means of the inclined chute $I^2$ to the trough-return belt, whereby they are returned to the feeding-table. The pans of biscuit are loaded upon carriers, whereby they are transferred to the oven-room X, Fig. 2, and they are then placed upon revolving shelves X' in the oven, wherein they remain until sufficiently browned. When taken from the oven, the interior of the biscuit is still quite soft and moist, and in order to fit them for commercial use they are placed upon racks or carriers and passed through a hot-air chamber Z.

Having thus described my invention, what I claim as new, and desire to secure by Letters Patent, is—

1. In apparatus for the purpose described, the combination of the grain-cages, the alined grain-cleaners, the alined boilers adapted for the reception of said cages, the drying-chute, a track leading from said cleaners to said boilers, and to said chute, means for transferring said cages from said cleaners to said boilers and from said boilers to said chute upon said track, and means for transferring said cages from said track into said boilers, and from said boilers back again to said track, substantially as specified.

2. In apparatus for the purpose described, the combination of the grain-cages, the alined grain-cleaners, the alined boilers adapted for the reception of said cages, a track leading from said cleaners to said boilers, means for transferring said cages from said cleaners to said boilers upon said track, means for transferring said cages from said track into said boilers, and from said boilers back again to said track, and means for rotating said cages in said boilers, substantially as specified.

3. In apparatus for the purpose described, the combination of the grain-cages, the alined grain-cleaners, the alined boilers adapted for the reception of said cages, the drying-chute, a track leading from said cleaners to said boilers and to said chute, means for transferring said cages from said cleaners to said boilers, and from said boilers to said chute upon said track, means for transferring said cages from said track into said boilers and from said boilers back again to said track, a traveling receiver under said chute, having a movable bottom, drying-trays, and a carriage for said trays arranged beneath said receiver, substantially as specified.

4. In apparatus for the purpose described, the combination of the drying-chute, a traveling compartment-receiver beneath said chute, movable bottoms for said compartments, drying-trays, and a carriage for said trays arranged beneath said receiver, substantially as specified.

5. In apparatus for the purpose described, the combination of the grain-drying chute, a traveling receiver under said chute, and having a movable bottom, drying-trays, a carriage for said trays arranged under said receiver, an elevator for the grain, and reducing-machines fed by said elevator, substantially as specified.

6. In apparatus for the purpose described, the combination of a grain-elevator, grain-reducing machines, a hopper into which the grain is discharged from said elevator, and a plurality of spouts leading from said hopper and feeding said reducing-machines, substantially as specified.

7. In apparatus for the purpose described, the grain-reducing machines, means for discharging the reduced product from said machines, a traveling belt beneath said machines, receiving-troughs carried by said belt, the trough-feeding belt, and means for moving said trough-feeding belt a little faster than said first-named belt, substantially as specified.

8. In apparatus for the purpose described, the grain-reducing machines, means for discharging the reduced product from said machines, a traveling belt beneath said machines, receiving-troughs carried by said belt, and a section-cutter operated by said troughs to divide the reduced product contained thereby between the troughs, substantially as specified.

9. In apparatus for the purpose described, the grain-reducing machines, means for discharging the reduced product from said machines, a traveling belt beneath said machines, receiving-troughs carried by said belt, a section-cutter operated by said troughs to divide the reduced product contained thereby between said troughs, and means for returning said cutter to raised position, substantially as specified.

10. In apparatus for the purpose described, the grain-reducing machines, means for discharging the reduced product from said machines, a traveling belt beneath said machines, receiving-troughs carried by said belt, a section-cutter operated to divide the reduced product contained by said troughs between said troughs, and a gang-cutter operated to divide the reduced product contained by each said trough into blocks, substantially as specified.

11. In apparatus for the purpose described, the grain-reducing machines, means for discharging the reduced product from said machines, a traveling belt beneath said machines, receiving-troughs carried by said belt, and having transverse slits therein, a section-cutter operated to divide the reduced product contained by said troughs between said troughs, and a gang-cutter having knives operating in the transverse slits of said troughs to divide the reduced product of each trough into blocks, substantially as specified.

12. In apparatus for the purpose described, the grain-reducing machines, means for discharging the reduced product from said machines, a traveling belt beneath said machines, receiving-troughs carried by said belt, and having transverse slits therein, a section-cutter operated by said troughs to divide the product contained thereby between the troughs, and a gang-cutter having knives operating in the transverse slits of said troughs to divide the reduced product of each trough into blocks, substantially as specified.

13. In apparatus for the purpose described, the grain-reducing machines, means for discharging the reduced product from said machines, a traveling belt beneath said machines, receiving-troughs carried by said belt, means for dividing the reduced product contained by said troughs between the troughs, means for dividing the reduced product of each trough into blocks, and a panning-table in line with said reducing-machines, substantially as specified.

14. In apparatus for the purpose described, the grain-reducing machines, means for discharging the reduced product from said machines, a traveling belt beneath said machines, receiving-troughs carried by said belt, a trough-feeding belt arranged to move a little faster than said first-named belt, means for dividing the reduced product contained by said troughs between the troughs, and means for dividing the reduced product of each trough into blocks, substantially as specified.

15. In apparatus for the purpose described, the grain-reducing machines, means for discharging the reduced product from said machines, a traveling belt beneath said machines, receiving-troughs carried by said belt, a trough-feeding table having a belt arranged to move a little faster than said first-named belt, means for dividing the reduced product contained by said troughs between the troughs, means for dividing the reduced product of each trough into blocks, a panning-table in line with said reducing-machines, a trough-return belt extending underneath said panning-table forwardly under said reducing-machines and trough-feeding table, a chute leading downwardly from said panning-table to said return-belt, and a chute leading upwardly from said return-belt, to said trough-feeding belt, substantially as specified.

16. The combination with the gang reducing-machines, the sectional, transversely-slotted receivers, and the carrying mechanism for said receivers, of the gang-cutter table having a central roller-way to receive said receivers, and lateral gang-cutters having upper and lower knives, vertically-movable risers adapted to support said receivers thereon, together with suitable mechanisms for actuating the upper knives, and the said risers, substantially as specified.

17. The cutting-table having a central roller-way, and lateral gang cutting mechanisms upon each side thereof, said gang cutting mechanism having vertically-movable risers adapted to support the material being cut, means for actuating the said risers, an upper, vertically-movable gang of knives, and a lower stationary gang, together with suitable mechanism for actuating the upper knives, substantially as specified.

18. The combination with the gang reducing-machines having the roller-heads, the endless feed-belt which travels beneath the said heads, the feed-table at the front of the gang-machine, its feed-belt adapted to be rotated at a slightly-greater rate of speed than the feed-belt of the gang-machines, the sectional, slotted receivers, the section-cutter, the gang-cutters, the panning-table, the endless return-belt, extending from the feed-table to the panning-table, and the inclined chutes, leading from each of said tables to the said return-belt, substantially as specified.

19. The combination with the gang reducing-machines, the endless feed-belt, and the sectional receivers adapted to be carried by the said belt, of the automatic section-cutter, and the gang-cutters, substantially as specified.

20. The combination with the gang reducing-machines, the endless feed-belt, and the sectional receivers adapted to be carried by said belt, and having transversely-slotted bottoms, of the two gang-cutters, having upper and lower sets of knives with actuating mechanisms therefor, and a roller-way between said cutters, and adapted to receive said receivers, substantially as specified.

In testimony whereof I affix my signature in presence of two witnesses.

HENRY D. PERKY.

Witnesses:
J. G. POMERENE,
B. E. SUTTON.